(No Model.)

A. L. BAILY.
HOSE FASTENING.

No. 515,893.

Patented Mar. 6, 1894.

Witnesses
W. B. Howe
F. S. Berry

Inventor
Alden L. Baily
By his Attorney
J. B. Thurston

UNITED STATES PATENT OFFICE.

ALDEN L. BAILY, OF ST. JOHNSBURY, VERMONT.

HOSE-FASTENING.

SPECIFICATION forming part of Letters Patent No. 515,893, dated March 6, 1894.

Application filed March 31, 1893. Serial No. 468,539. (No model.)

*To all whom it may concern:*

Be it known that I, ALDEN L. BAILY, a citizen of the United States, residing at St. Johnsbury, in the county of Caledonia and State of Vermont, have invented certain new and useful Improvements in Hose-Fastenings; and I do hereby declare the following to be a full, clear, and exact description of the invention, such as will enable others skilled in the art to which it appertains to make and use the same.

This invention relates to metallic connections for flexible hose.

The invention applies more especially to the fastening of an end of hose to a section of coupling, the object being to provide an effective device for the purpose which is simple in construction.

The invention will be fully set forth in the following specification and claim, and clearly illustrated in the accompanying drawings, forming a part thereof, of which—

Figure 1:
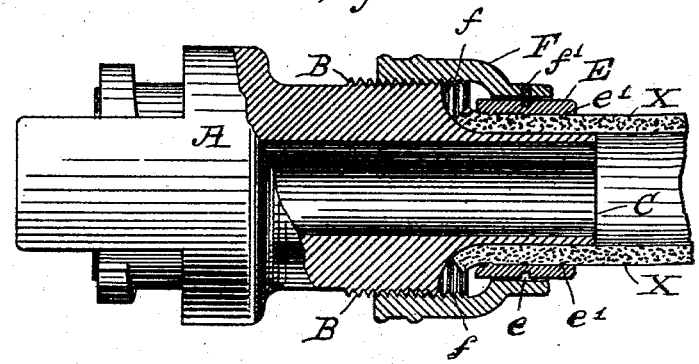
Figure 2:
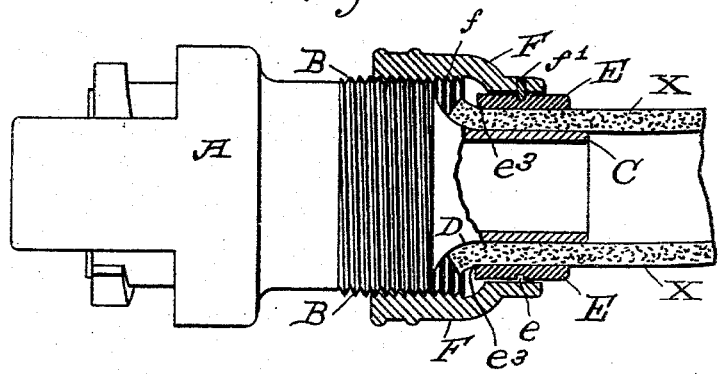
Figure 3:
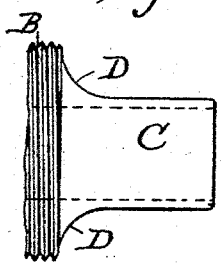
Figure 4:
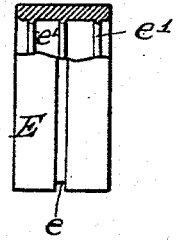
Figure 5:
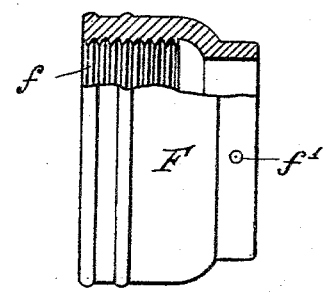

Figure 1. represents a portion of a hose coupling, having my improved hose connecting device holding an end of hose thereon, in section. Fig. 2. is a similar view showing the same parts with my improvements in modified form. Fig. 3. is a detached broken elevation of the hose coupling. Fig. 4. is a detached broken elevation of the interior sleeve of my improved hose attaching device. Fig. 5 is a similar view of the external sleeve.

Similar letters of reference designate like parts.

The coupler section A, is provided with a threaded portion near that end to which the hose is attached, as shown at B, and the portion C, adapted to enter an end of hose X, is reduced in diameter as shown, and its straight cylindrical sides join the said threaded portion B, by a curved shoulder D, said curve having a tendency to slightly spread the edge of the hose, X when the latter is forced hard onto said part C, of the coupler section A.

My improved hose fastener acts in conjunction with the said shoulder, D, and consists of the sleeves E, and F, movably connected, the former within the latter; the sleeve F, being larger at one end and containing an internal thread $f$, as shown. The smaller end of said sleeve is movably attached to said sleeve E, by means of a pin or screw $f'$, which is passed through the said sleeve F, at the proper point to enter the groove $e$, of the sleeve E. The enlarged portion of said sleeve F, is provided with an internal thread $f$, fitting the threaded portion B, of the coupler section A. The pin and groove connection of the sleeves E F, I consider preferable to any construction permitting the longitudinal movement of either sleeve independently of the other, and provided the sleeve E, should have a corrugated bore, or, should be provided with annular ridges $e'$, as shown in Figs. 1. to 4, said sleeve will crowd the end of hose X, well up onto the curved shoulder D, while the threaded sleeve F, is being turned onto the threaded portion B, of the coupler section A, even before said sleeve E, shall have commenced to be drawn lengthwise upon said hose X and toward the curved shoulder D, against which said sleeve finally presses the hose so tightly as to prevent leakage.

In the drawings I show two forms of sleeve E, one having a series of interior corrugations or ridges $e'$, and the end adjacent to the curved shoulder D, of coupler section A rounded as at $e^3$, while in the other construction, the inner end of said sleeve is square as at $e^3$, and the ridges $e'$, omitted, the square corner $e^3$, being depended upon to crowd the end of the hose X up against the shoulder D, of the coupler section A, and insure a tight joint.

What I claim is—

A hose fastening comprising a shank having an enlarged externally-threaded portion; and a narrowed portion having a constant diameter and separated from said enlarged portion by a concave ascensive shoulder; a sleeve consisting of a major and a minor portion each having a constant diameter, and a separating shoulder therefor; the said major portion having an internal screw thread whereby it may be turned upon the enlarged portion of the shank; the minor portion of the sleeve having an internally arranged collar provided with an annular groove to loosely receive a pin passed through the said minor portion, whereby they may be given a simultaneous longitudinal movement and the said collar may draw a hose end, passed over the narrowed portion of the shank, upon the ascensive shoulder and clamp it thereagainst, said collar having internally arranged projections whereby the said hose end may remain at all times under the influence of the collar and its actuating sleeve.

In testimony whereof I affix my signature in presence of two witnesses.

ALDEN L. BAILY.

Witnesses:
J. B. THURSTON,
C. A. GLOVER.